United States Patent
Singh et al.

(10) Patent No.: US 10,034,233 B1
(45) Date of Patent: Jul. 24, 2018

(54) SELECTING A COMMUNICATION SESSION TYPE BASED ON A HOP COUNT

(71) Applicant: Sprint Communications Company L.P., Overland Park, KS (US)

(72) Inventors: Jasinder Pal Singh, Olathe, KS (US); Deveshkumar Narendrapratap Rai, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/441,434

(22) Filed: Feb. 24, 2017

(51) Int. Cl.
*H04W 48/18* (2009.01)
*H04W 16/32* (2009.01)
*H04L 12/733* (2013.01)
*H04W 76/02* (2009.01)
*H04W 76/10* (2018.01)
*H04W 84/04* (2009.01)

(52) U.S. Cl.
CPC .............. *H04W 48/18* (2013.01); *H04L 45/20* (2013.01); *H04W 16/32* (2013.01); *H04W 76/02* (2013.01); *H04W 76/10* (2018.02); *H04W 84/045* (2013.01)

(58) Field of Classification Search
CPC ..... H04W 48/18; H04W 76/02; H04W 16/32; H04W 84/045; H04L 45/20
See application file for complete search history.

(56) References Cited

U.S. PATENT DOCUMENTS

| 7,193,966 B2 | 3/2007 | Gupta et al. |
| 8,976,662 B2 | 3/2015 | Somasundaram et al. |
| 9,391,805 B2 | 7/2016 | Wang et al. |
| 2004/0242154 A1* | 12/2004 | Takeda ................. H04B 7/2606 455/16 |
| 2016/0073331 A1* | 3/2016 | Balakrishnan .......... H04W 4/02 455/456.1 |
| 2016/0119739 A1* | 4/2016 | Hampel .................. H04W 4/70 370/315 |

* cited by examiner

*Primary Examiner* — Chuong A Ngo

(57) ABSTRACT

A method of operating User Equipment (UE) in a data communication network that comprises a macro base station and a plurality of wireless relays that serve the UE to select a communication session type based on a hop count. The method comprises UEs that attach to one of a plurality of wireless relays and determine a hop count for the attached wireless relay. The UEs select a session type based on the hop count and initiate a communication session of the selected session type with the attached wireless relay.

6 Claims, 6 Drawing Sheets

US 10,034,233 B1

SELECTING A COMMUNICATION SESSION TYPE BASED ON A HOP COUNT

TECHNICAL BACKGROUND

Wireless communication networks exchange user data between communication devices to facilitate various data services, like Internet access, voice calling, video calling, audio streaming, media streaming, gaming, data messaging, and the like. Wireless communication networks allow users to move about as they communicate. A popular form of wireless communication network is Long Term Evolution (LTE). Wireless relays are used to extend the coverage area of wireless networks including LTE networks.

The wireless relays serve user devices and exchange user data with a macro base station or another network gateway. In LTE networks, femto-cell relays and pico-cell relays exchange user data and user signaling over the air between User Equipment (UE) and eNodeBs. The wireless relays also exchange data and signaling between the UEs and a Secure Gateway (Se-GW) over a Local Area Network/Wide Area Network (LAN/WAN). These wireless relay communications use various combinations of Ethernet, Data over Cable System Interface Specification (DOCSIS), Wave Division Multiplex (WDM), Wireless Fidelity (WIFI), Long Term Evolution (LTE), WIFI/LTE Aggregation (LWA), or some other data communication protocol.

Wireless relays may be connected to other wireless relays in a chain configuration back to the macro base station. The number of connections between the macro base station and a wireless relay may also be called a hop count. Communication services may be affected by the hop count or the number of hops to the macro base station. UEs may determine the hop count of the attached wireless relay.

OVERVIEW

Examples disclosed herein provide a system, method, hardware, and software to select a communication session type based on a hop count. The method comprises User Equipment (UE) attaching to one of a plurality of wireless relays and determining a hop count for the attached wireless relay. The method further includes the UE selecting a session type based on the hop count. The method also includes the UE initiating a communication session of the selected session type with the attached wireless relay.

In another example, UEs for a data communication network that comprises a macro base station and wireless relays that serve UEs. The UE selects a session type for a communication session based on the hop count. The UE attaches to one of the wireless relays and determines the hop count for the attached wireless relay. The UE selects a session type based on the hop count, and initiates a communication session of the selected session type with the attached wireless relay.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention, and that the features described below can be combined in various ways to form multiple variations of the invention. As a result, the invention is not limited to the specific examples described below, but only by the claims and their equivalents.

Figure 1:
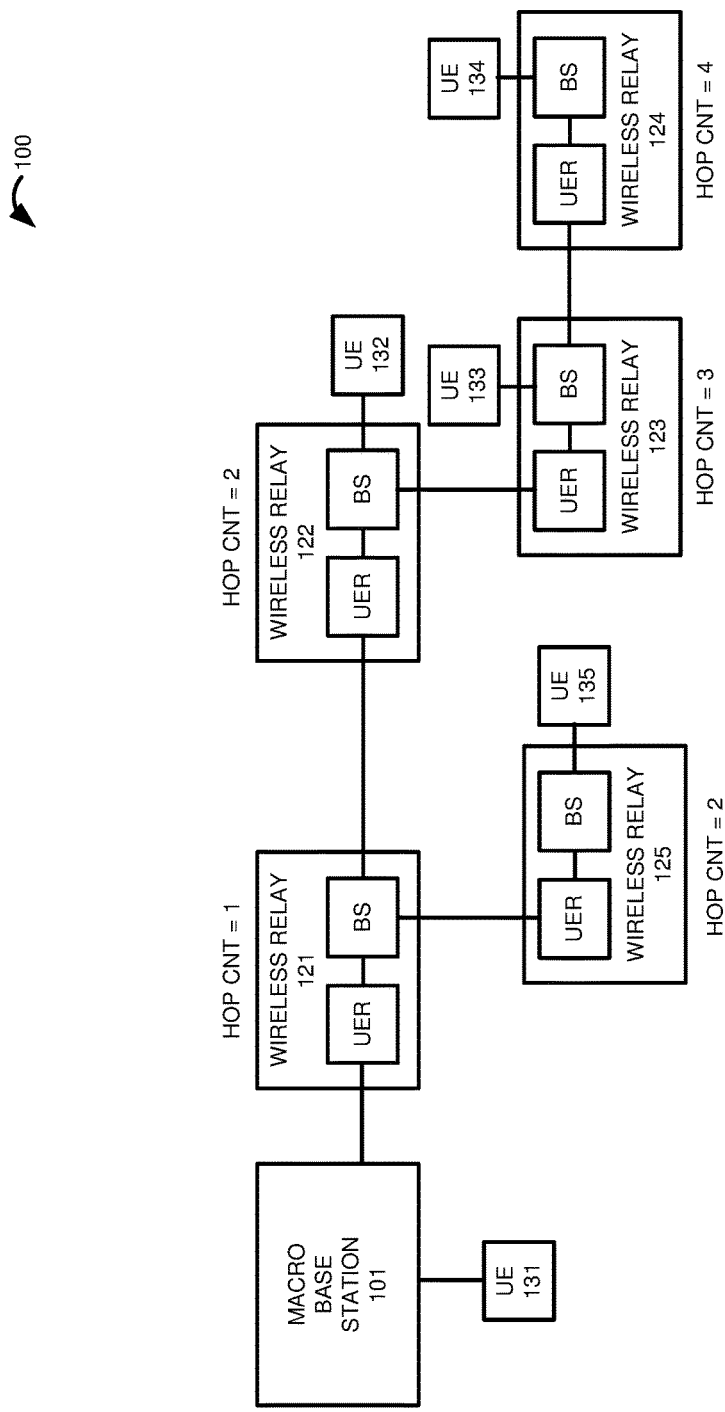
FIG. 1 illustrates a data communication network to select a communication session type based on a hop count.

FIG. 1 illustrates data communication network 100 to select a communication session type for UEs 131-135 based on a hop count to macro base station 101. Data communication network 100 includes macro base station 101, wireless relays 121-125, and UEs 131-135. Wireless relays 121-125 include a relay UE (UER) and a base station (BS). Macro base station 101, wireless relay 121, and wireless relay 125 form a wireless relay chain. Macro base station 101, wireless relay 121, wireless relay 122, wireless relay 123, and wireless relay 124 form another wireless relay chain. UE 131 is attached to macro base station 101. UE 132 is attached to wireless relay 122. UE 133 is attached to wireless relay 123. UE 134 is attached wireless relay 124. Wireless relay 125 is attached to UE 135.

In some examples, macro base station 101 may comprise an eNodeB. Although not required, wireless relays 121-125 may comprise femto-cell and pico-cell base stations. Examples of UEs 131-135 include wireless communication devices such as a telephone, cellular phone, mobile phone, smartphone, Personal Digital Assistant (PDA), laptop, computer, e-book, eReader, mobile Internet appliance, or some other wireless communication device with a wireless transceiver—including combinations thereof.

In operation, UEs 131-135 attach to macro base station 101 or one of wireless relays 121-125. UEs 131-135 determine a hop count for attached wireless relay 121-125. In some examples, UE 131 determines it is attached to macro base station 101 and does not need to determine a hop count. UEs 131-135 select a session type based on the hop count. For example, session types include Circuit-Switch Fallback (CSFB), enhanced CSFB (eCSFB), single radio LTE (SR-LTE), or other session types. UEs 131-135 initiate a communication session of the selected session type with attached macro base station 101 or wireless relay 121-125.

Figure 2:
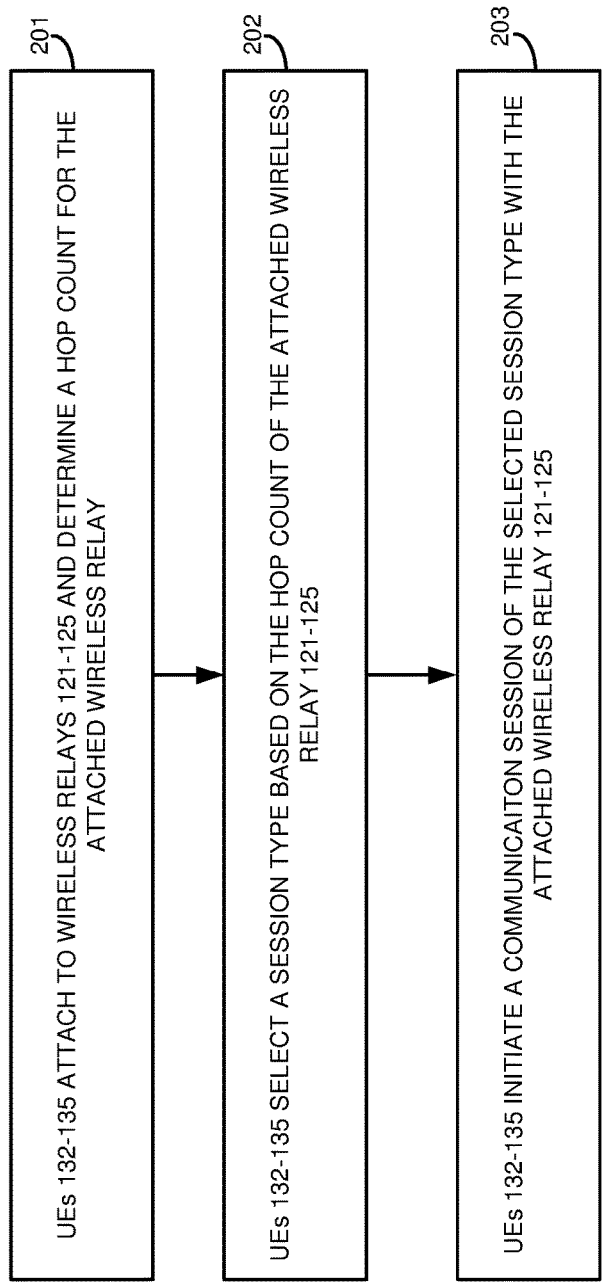
FIG. 2 illustrates the operation of the data communication network to select the communications session type based on the hop count.

FIG. 2 illustrates the operation of data communication network 100 to select a communication session type for UEs 131-135 based on the hop count to macro base station 101. UEs 132-135 attach to one of wireless relays 121-125 and determine a hop count for the attached wireless relay (201). In some examples, UEs 132-135 may read a System Information Block (SIB) transmitted by wireless relays 121-125 to determine the hop count. UEs 132-135 select a session type based on the hop count (202). UEs 132-135 initiate a communication session of the selected session type with attached wireless relay 121-125 (203). In some examples, request for the communication session may indicate the session type.

Figure 3:
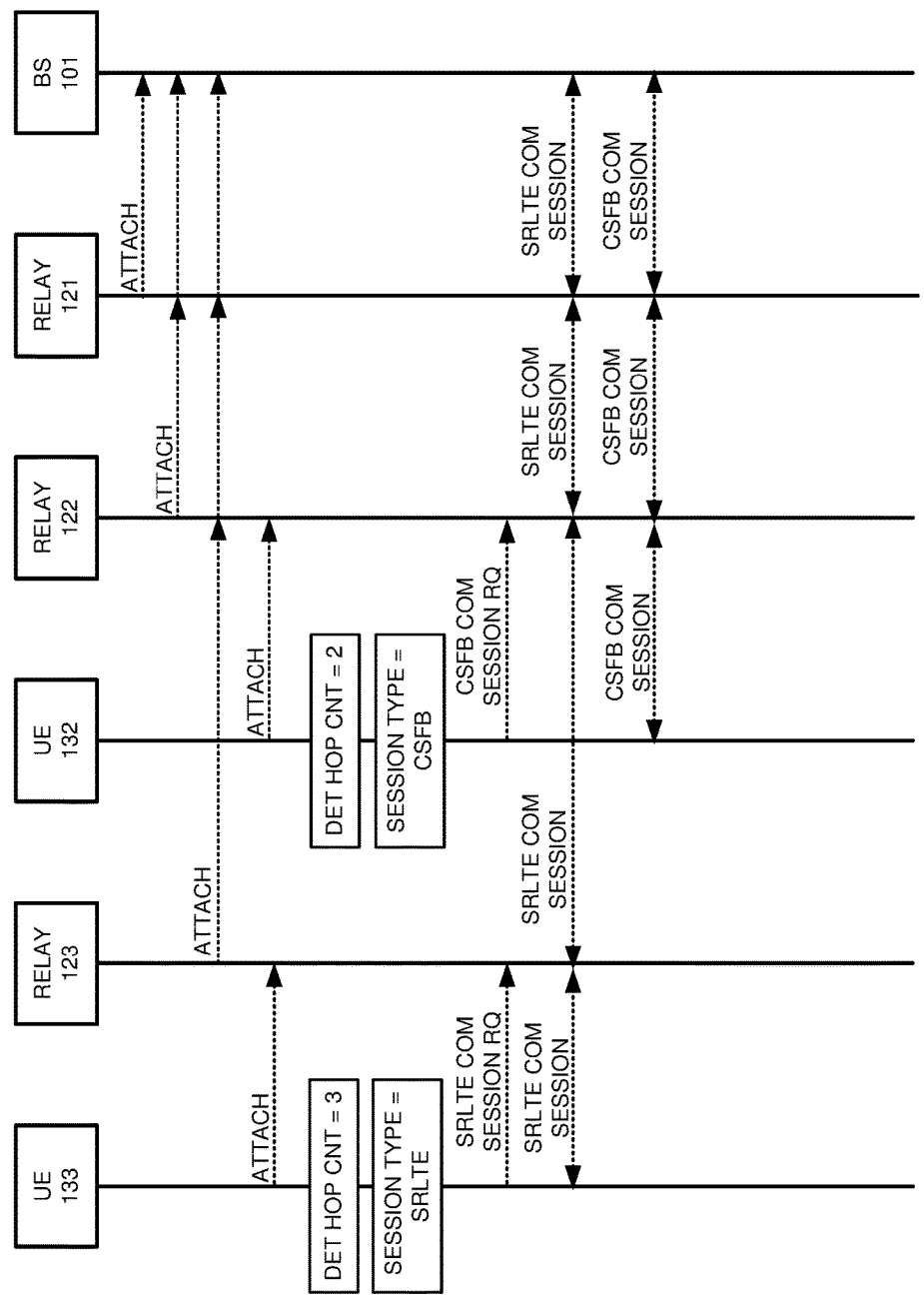
FIG. 3 illustrates the operation of the data communication network to select the communication session type based on the hop count.

FIG. 3 illustrates the operation of data communication network 100 to select a communication session type based on the hop count to macro base station 101. Wireless relays 121-123 attach to macro base station 101. Wireless relay 123 attaches to wireless relay 122. Wireless relay 122 is attached to wireless relay 121, which is attached to macro base station 101. For example, wireless relays 121-123 may attach to macro base station 101 upon power up. In some examples, wireless relays 121-123 may change location and attached to a different macro base station. UE 132 attaches to wireless relay 122 and UE 133 attaches to wireless relay 123.

UEs 132-133 determine a hop count for attached wireless relays 122-123, respectively. Using FIG. 1 as an illustrative example, the hop count for wireless relay 122 is two and the hop count for wireless relay 123 is three. In this example, UE 132 selects a CSFB communication session based on the hop count and transfers a CSFB session request to wireless relay 122. A CSFB communication session is established with UE 132, wireless relay 122, and macro base station 101. UE 133 selects a SRLTE communication session based on the hop count and transfers an SRLTE session request to wireless relay 123. An SRLTE communication session is established with UE 133, wireless relay 123, and macro base station 101.

Figure 4:
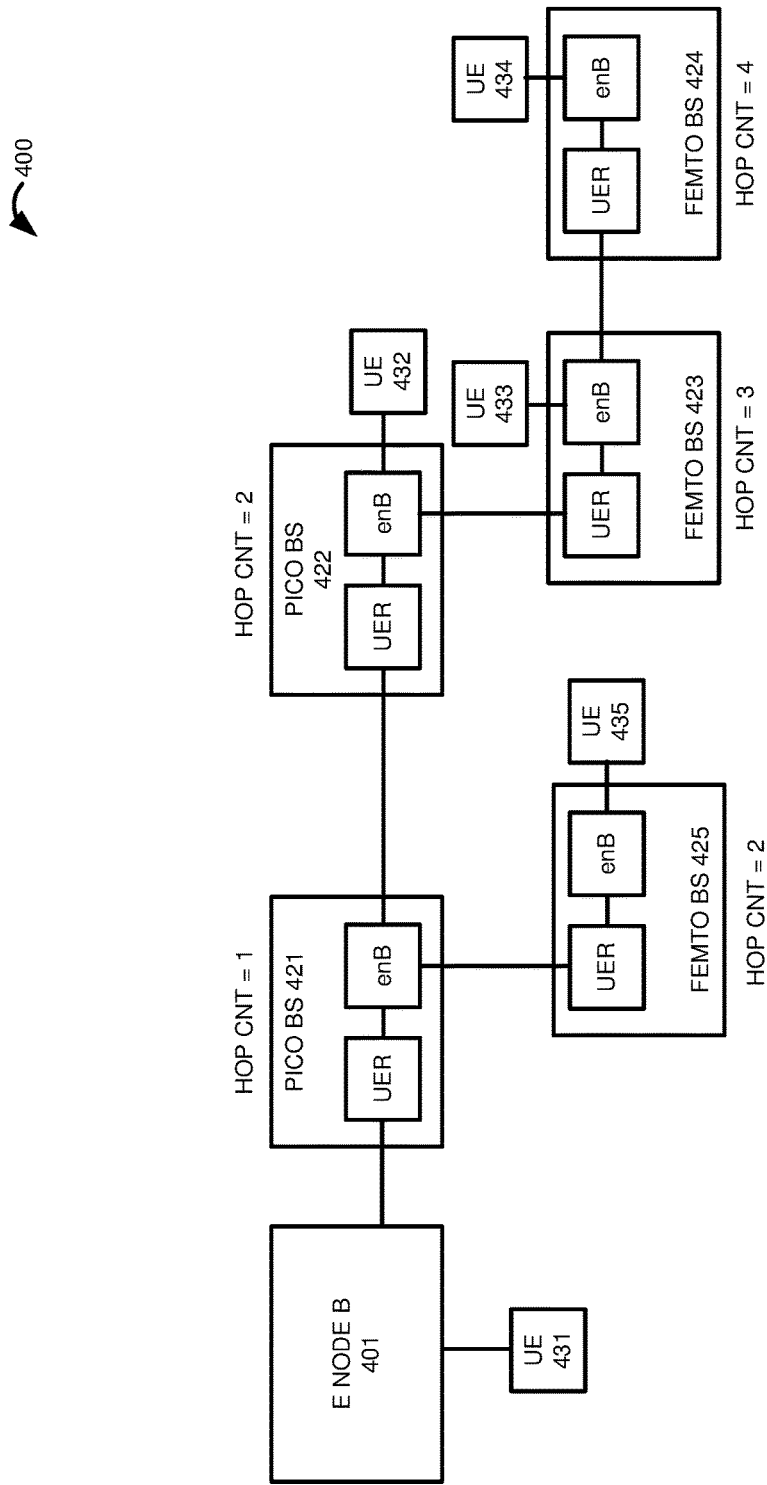
FIG. 4 illustrates a Long Term Evolution (LTE) communication network to select a communication session type based on a hop count.

FIG. 4 illustrates the operation of LTE communication network 400 to select a communication session type for UEs 431-435 based on a hop count to eNodeB 401. LTE communication network 400 includes eNodeB 401, pico-cell base stations 421-422, femto-cell base stations 423-425, and UEs 431-435. Pico-cell and femto-cell base stations 421-425 include a relay UE (UER) and an eNodeB. eNodeB 401, pico-cell 421, and femto-cell 425 form a chain. eNodeB 401, pico-cell 422, femto-cell 423, and femto-cell 424 form another wireless relay chain. UE 431 is attached to eNodeB 401. UE 432 is attached to pico-cell 422. UE 433 is attached to femto-cell 423. UE 434 is attached femto-cell 424. Femto-cell 425 is attached to UE 435.

Figure 5:
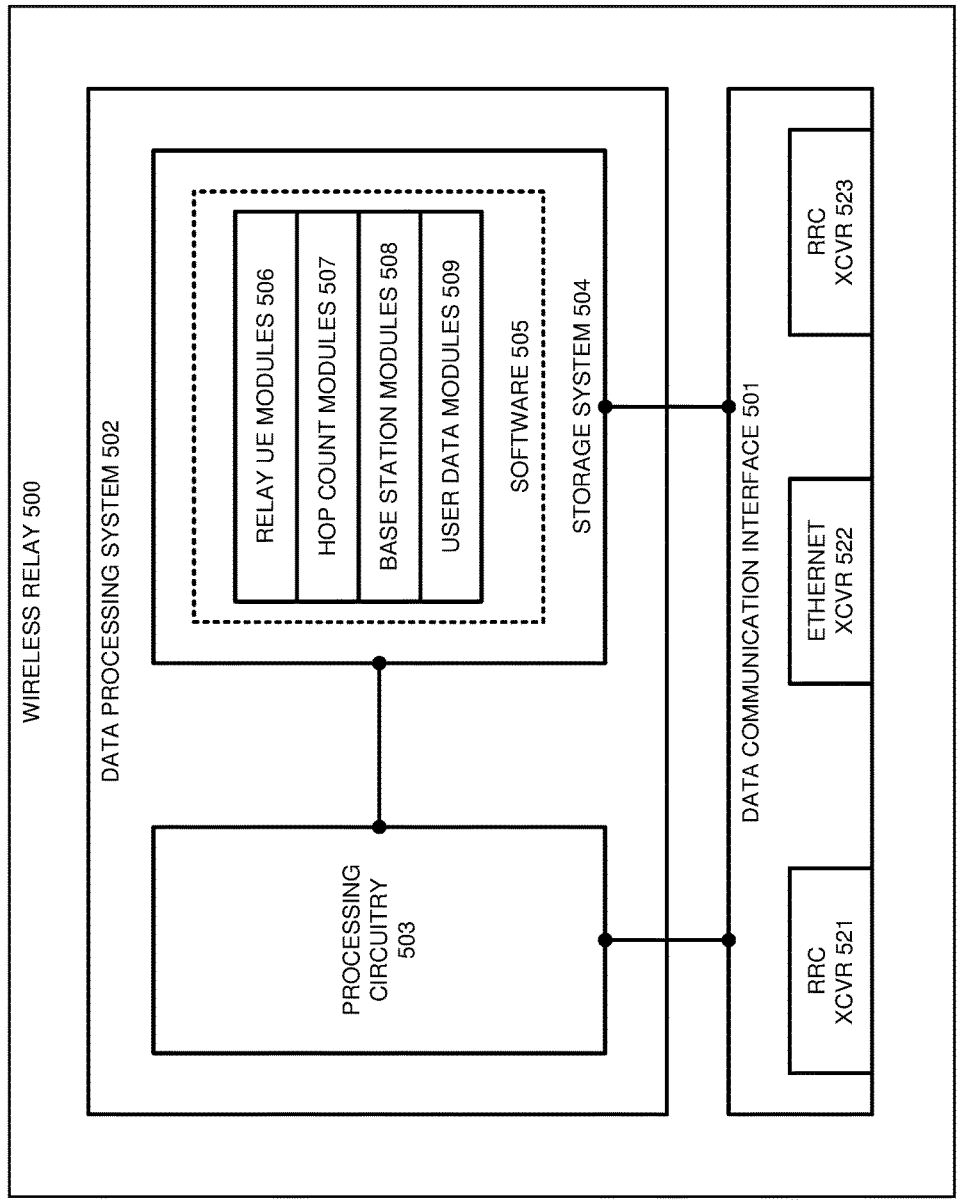
FIG. 5 illustrates an example of a wireless relay.

FIG. 5 illustrates wireless relay 500. Wireless relay 500 is an example of wireless relays 121-125, pico-cells 421-422, and femto-cells 423-425. Although these systems may use alternative configurations and operations. Wireless relay 500 comprises data communication interface 501 and data processing system 502. Data communication interface 501 comprises RRC transceiver 521, Ethernet transceiver 522, and RRC transceiver 523. Data processing system 502 comprises processing circuitry 503 and storage system 504. Storage system 504 stores software 505. Software 505 includes respective software modules 506-509.

Transceivers 521-523 comprise communication components, such as antennas, amplifiers, filters, modulators, ports, bus interfaces, digital signal processors, memory, software, and the like. Processing circuitry 503 comprises circuit boards, bus interfaces, integrated micro-processing circuitry, and associated electronics. Storage system 504 comprises non-transitory, machine-readable, data storage media, such as flash drives, disc drives, memory circuitry, data servers, and the like. Software 505 comprises machine-readable instructions that control the operation of processing circuitry 503 when executed. Wireless relay 500 may be centralized or distributed. All or portions of software 506-509 may be externally stored on one or more storage media, such as circuitry, discs, and the like. Some conventional aspects of wireless relay 500 are omitted for clarity, such as power supplies, enclosures, and the like.

When executed by processing circuitry 503, software modules 506-509 direct circuitry 503 to perform the following operations. Relay UE modules 506 direct RRC transceiver 523 to interact with donor eNodeBs. Relay UE modules 506 also direct processing system 502 to scan for donor eNodeBs. Hop count modules 507 direct processing system 502 to determine a hop count to the donor eNodeB. Base station modules 508 direct RRC transceiver 521 to interact with UEs. User data modules 509 exchange user data between transceivers 521-523.

Figure 6:
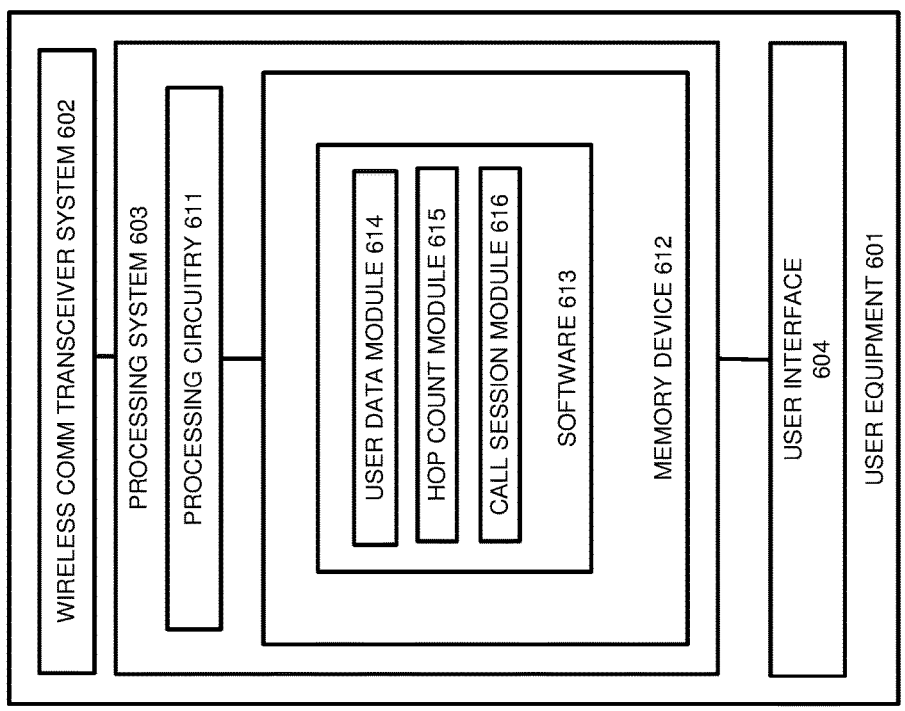
FIG. 6 illustrates an example of a UE.

FIG. 6 illustrates User Equipment (UE) 601. UE 601 is an example of UEs 131-135 and UEs 431-435, although UEs 131-135 and UEs 431-435 could use alternative configurations. UE 601 comprises wireless communication transceiver system 602, processing system 603, and user interface 604. Processing system 603 is linked to wireless communication transceiver system 602 and user interface 604. Processing system 603 includes processing circuitry 611 and memory device 612 that stores operating software 613. UE 601 may include other well-known components such as a battery and enclosure that are not shown for clarity. UE 601 may be a telephone, cellular phone, mobile phone, smartphone, personal digital assistant (PDA), computer, laptop, tablet, e-book, mobile Internet appliance, media player, game console, wireless network interface card, or some other wireless communication apparatus—including combinations thereof.

Wireless communication transceiver system 602 comprises RF communication circuitry and an antenna. The RF communication circuitry typically includes an amplifier, filter, RF modulator, and signal processing circuitry. Wireless communication transceiver system 602 may also include a memory device, software, processing circuitry, or some other communication device. Wireless communication transceiver system 602 may use various communication formats, such as LTE, CDMA, EVDO, WIMAX, GSM, WIFI, HSPA, or some other wireless communication format—including combinations thereof.

User interface 604 comprises components that interact with a user to receive user inputs and to present media and/or information. User interface 604 may include a speaker, microphone, buttons, lights, display screen, touch screen, touch pad, scroll wheel, communication port, or some other user input/output apparatus—including combinations thereof. User interface 604 may be omitted in some examples.

Processing circuitry 611 comprises microprocessor and other circuitry that retrieves and executes software 613 from memory device 612. Memory device 612 comprises a non-transitory storage medium, such as a disk drive, flash drive, data storage circuitry, or some other memory apparatus. Processing circuitry 611 is typically mounted on a circuit board that may also hold memory device 612, portions of wireless communication transceiver system 602, and user interface 604. Software 613 comprises computer programs, firmware, or some other form of machine-readable processing instructions. Software 613 may include an operating system, utilities, drivers, network interfaces, applications, or some other type of software.

When executed, software 613 directs processing system 603 to operate as described herein to use hop count data and other network data to select a communication session type. In particular, user data module 614 directs processing system 603 to exchange user data with a wireless relay or macro base station. Hop count module 615 directs processing system 603 to determine a hop count for an attached wireless relay. Call session module 616 directs processing system 603 to establish a communication session of the selected communication session type.

Referring back to FIG. 1, UEs 131-135 comprise Radio Frequency (RF) communication circuitry and an antenna. The RF communication circuitry typically includes an amplifier, filter, modulator, and signal processing circuitry. UEs 131-135 may also include a user interface, memory device, software, processing circuitry, or some other communication components. UEs 131-135 may be a telephone, computer, e-book, mobile Internet appliance, wireless network interface card, media player, game console, or some other wireless communication apparatus—including combinations thereof.

Wireless relays 121-125 comprise RF communication circuitry and an antenna. The RF communication circuitry typically includes an amplifier, filter, RF modulator, and signal processing circuitry. Wireless relays 121-125 may also comprise a router, server, memory device, software, processing circuitry, cabling, power supply, network communication interface, structural support, or some other communication apparatus. Wireless relays 121-125 could be a femto-cell base station, pico-cell base station, WIFI hotspot, or some other wireless access point—including combinations thereof.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a Long Term Evolution (LTE) User Equipment (UE) that comprises radio circuitry and processing circuitry in a data communication network that comprises a macrocell base station, a femtocell base station, and multiple wireless relays, the method comprising:
the LTE UE radio circuitry wirelessly receiving a System Information Block (SIB) from the femtocell base station that indicates a wireless relay hop count between the femtocell base station and the macrocell base station;
the LTE UE processing circuitry determining the wireless relay hop count for the femtocell base station based on the SIB;
the LTE UE processing circuitry selecting one of a Circuit Switch Fallback (CSFB) communication session type or a Single Radio Long Term Evolution (SRLTE) communication session type based on the wireless relay hop count for the femtocell base station;
the LTE UE processing circuitry initiating a communication session of the selected one of the CSFB communication session type or the SRLTE communication session type with the femtocell base station; and
the LTE UE radio communication circuitry wirelessly exchanging user data with the femtocell base station over the communication session.

2. The method of claim 1 wherein the CSFB communication session type comprises an enhanced Circuit Switch Fallback (eCSFB) communication session type.

3. The method of claim 1 wherein the macrocell base station comprises a Long Term Evolution evolved Node B (eNodeB).

4. A Long Term Evolution (LTE) User Equipment (UE) for a data communication network that comprises a macrocell base station, a femtocell base station, and multiple wireless relays, the LTE UE comprising:
LTE UE radio circuitry configured to wirelessly receive a System Information Block (SIB) from the femtocell base station that indicates a wireless relay hop count between the femtocell base station and the macrocell base station;
LTE UE processing circuitry configured to determine the wireless relay hop count for the femtocell base station based on the SIB, select one of a Circuit Switch Fallback (CSFB) communication session type or a Single Radio Long Term Evolution (SRLTE) communication session type based on the wireless relay hop count for the femtocell base station, and initiate a communication session of the selected one of the CSFB communication session type or the SRLTE communication session type with the femtocell base station; and
the LTE UE radio circuitry configured to wirelessly exchange user data with the femtocell base station over the communication session.

5. The data communication network of claim 4 wherein the CSFB communication session type comprises an enhanced Circuit Switch Fallback (eCSFB) communication session type.

6. The data communication network of claim 4 wherein the macrocell base station comprises a Long Term Evolution evolved Node B (eNodeB).

* * * * *